United States Patent
Henion et al.

(10) Patent No.: US 11,679,721 B2
(45) Date of Patent: Jun. 20, 2023

(54) REAR VIEW DEVICE WITH MULTI-PIECE BACKING PLATE

(71) Applicant: Motherson Innovations Company Limited, London (GB)

(72) Inventors: Paul Henion, Troy, MI (US); Gary Sinelli, Troy, MI (US)

(73) Assignee: Motherson Innovations Company Limited, London (GB)

(*) Notice: Subject to any disclaimer, the term of this patent is extended or adjusted under 35 U.S.C. 154(b) by 133 days.

(21) Appl. No.: 17/199,908

(22) Filed: Mar. 12, 2021

(65) Prior Publication Data
US 2022/0289110 A1    Sep. 15, 2022

(51) Int. Cl.
*B60R 1/12*    (2006.01)
*B60R 1/08*    (2006.01)

(52) U.S. Cl.
CPC ............ *B60R 1/1207* (2013.01); *B60R 1/088* (2013.01); *B60R 2001/1215* (2013.01); *B60R 2001/1253* (2013.01)

(58) Field of Classification Search
CPC .................. B60R 1/1207; B60R 1/088; B60R 2001/1215; B60R 2001/1253
See application file for complete search history.

(56) References Cited

U.S. PATENT DOCUMENTS

| | | | |
|---|---|---|---|
| 9,580,017 B2 | 2/2017 | Foote et al. | |
| 10,723,268 B2* | 7/2020 | Sinelli | B60Q 1/2665 |
| 2002/0072026 A1* | 6/2002 | Lynam | B60R 1/082 |
| | | | 432/77 |
| 2004/0190166 A1 | 9/2004 | Lynarm et al. | |
| 2009/0040306 A1* | 2/2009 | Foote | B60R 1/04 |
| | | | 348/148 |
| 2017/0267179 A1 | 9/2017 | Herrmann et al. | |
| 2017/0297494 A1 | 10/2017 | Lynarm | |
| 2019/0344717 A1* | 11/2019 | Sinelli | F21S 45/37 |

FOREIGN PATENT DOCUMENTS

EP    2889183 A1    7/2015

* cited by examiner

*Primary Examiner* — Sath V Perungavoor
*Assistant Examiner* — Tyler B Edwards
(74) *Attorney, Agent, or Firm* — Jones Day (57) ABSTRACT

A rearview device for use with a vehicle includes a primary reflective element backing plate, a primary reflective element positioned on the primary reflective element backing plate, a secondary reflective element backing plate, a secondary reflective element positioned on the secondary reflective element backing plate, and an attachment mechanism including at least one clip or projection to attached the secondary reflective element to the primary reflective element backing plate. The attachment mechanism aligns a primary central axis of the primary reflective element to a secondary central axis of the secondary reflective element to be substantially parallel.

16 Claims, 7 Drawing Sheets

REAR VIEW DEVICE WITH MULTI-PIECE BACKING PLATE

FIELD

The present disclosure relates to a rear view device for a motor vehicle. More specifically, a rear view device for a motor vehicle including a primary and secondary reflective element each positioned on a primary and secondary reflective element backing plate attached to one another.

BACKGROUND

The statements in this section merely provide background information related to the present disclosure and may not constitute prior art. Blind Spot rear view devices are well known in the art and include automotive rearview mirrors that have a main viewing reflector combined with a secondary blind spot reflector both contained on a single piece of molded plastic. Both the main reflector and the blind spot reflector move in unison when the operator adjusts his field of view with the electric actuator (or manual version) within the automotive rearview device. Typically, the backing plate of the main reflector and the backing plate of the blind spot reflector are formed as a single piece.

In addition, rear view devices, such as those including a camera pod, are typically exposed to the outside environment when used as a side view mirror secured to the outside of a vehicle and when used inside a vehicle as an internal rear view mirror. Rear view devices are typically made up of many components which require a number of different assembly parts and are complicated and expensive to manufacture. In certain applications, a conventional rear view device typically fails to provide a full and expansive field of view including a sufficiently wide angle view as may be desired by a driver for viewing the driver's blind spot.

Typically rearview devices do not provide protection for a spotter mirror element. This allows the spotter mirror to incur damage. An example would be in colder climates it is typical to have ice or snow coating the rearview device in winter. When the ice and snow is removed with a scrapping device, the spotter mirror may be damaged.

SUMMARY

It should be noted that the features set out individually in the following description could be combined with each other in any technically advantageous manner. It should be understood, however, that the disclosure is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the disclosure. The figures are not necessarily drawn to scale. Like numbers used in the figures refer to like components. However, it will be understood that the use of a number to refer to a component in a given figure is not intended to limit the component in another figure labelled with the same number. The description further characterizes and specifies the present disclosure in particular in connection with the figures.

Generally the present disclosure provides for a rearview device for use with a vehicle including a primary reflective element with a primary central axis positioned on a primary reflective element baking plate. Additionally the rearview device includes a secondary reflective element having a secondary central axis positioned on a secondary reflective element backing plate. The secondary reflective element backing plate contains an attachment mechanism comprising at least one of one or more clips or projections configured to attach the secondary reflective element backing plate to the primary reflective element backing plate. The attachment mechanism aligns the primary central axis and the secondary central axis to be substantially parallel.

At least one of the primary reflective element backing plate and the secondary reflective element backing plate may include a polymeric substrate, and at least one of the primary reflective element may include a chromium-based reflective coating applied to a surface of the primary reflective element and the secondary reflective element may include a chromium-based reflective coating applied to a surface of the secondary reflective element and the secondary reflective element may include a chromium based reflective coating applied to a polymeric resin wherein the secondary reflective element and the secondary reflective element backing plate are one piece.

In one variation, a surface of the primary reflective element backing plate or the secondary reflective element backing plate may be at least one of planar, curved and convex shaped. In another variation, the surface of the primary reflective element backing plate has a different shape than the secondary reflective element backing plate.

Each of the primary reflective element and the secondary reflective element may include at least one of a coating, a chromium-based reflective coating, a reflective surface, a display, a screen, an LED screen, and an LCD screen.

The secondary reflective element may be a spotter mirror providing a wider field of view than the primary reflective element. The secondary reflective element is aspheric or spherical and may have a single or multiple radius of curvature.

The secondary reflective element in one variation is round in profile and possesses one unit of magnification which can range from 150 mm spherical radius to 500 mm spherical radius. The secondary reflective element in another variation has a first radius of curvature from 275 mm to 500 mm and a second radius of curvature from 150 mm to 375 mm.

At least one of the secondary reflective element backing plate and primary reflective element backing plate comprises an exposed perimeter framing portion separating the primary reflective element from the secondary reflective element. The perimeter framing portion may be textured or grained and have at least one symbol, logo, text or light element. The perimeter framing portion has a rear surface that extend beyond a viewing surface of the secondary reflective element.

The secondary reflective element backing plate and the primary reflective element backing plate move together in unison with an actuator such that movement of the actuator simultaneously and similarly moves the primary reflective element and the secondary reflective element. The secondary reflective element is attached to the secondary reflective element backing plate by adhesive, a heating pad, or at least one clip.

In another aspect, the present disclosure provides for a rearview device for use with a vehicle including a primary reflective element with a primary central axis positioned on a primary reflective element baking plate. Additionally the rearview device includes a secondary reflective element having a secondary central axis positioned on a secondary reflective element backing plate. The secondary reflective element backing plate includes an exposed perimeter framing portion separating the primary reflective element from the secondary reflective element and an attachment mechanism comprising at least one of one or more clips or projections configured to attach the secondary reflective element backing plate to the primary reflective element backing plate. The attachment mechanism aligns the primary central axis and the secondary central axis to be substantially parallel.

In another aspect, the present disclosure provides for a rearview device for use with a vehicle including a primary reflective element with a primary central axis positioned on a primary reflective element baking plate. Additionally the rearview device includes a secondary reflective element having a secondary central axis positioned on a secondary reflective element backing plate. The secondary reflective element has a radius of curvature in the vertical direction that is different from the radius of curvature in the horizontal direction. The secondary reflective element backing plate includes an attachment mechanism comprising at least one of one or more clips or projections configured to attach the secondary reflective element backing plate to the primary reflective element backing plate. The attachment mechanism aligns the primary central axis and the secondary central axis to be substantially parallel.

DRAWINGS

In order that the disclosure may be well understood, there will now be described various forms thereof, given by way of example, reference being made to the accompanying drawings, in which.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is merely exemplary in nature and is not intended to limit the present disclosure, application, or uses. It should be understood that throughout the drawings, corresponding reference numerals indicate like or corresponding parts and features.

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness. The term "rearview" is here defined as a view of the surrounding area, which is not in the field of view of the driver, i.e. the directions opposing, left, right, below and above of the viewing direction, but can also comprise the view in the direction of the viewing direction of the driver and/or any combinations of the directions. The term "driver" and "driver of the vehicle" relates here to the person controlling the main parameters of the vehicle, such as for example direction, speed and/or altitude, e.g. normally the person located in the location specified for the controlling person, for example a seat, but can also relate to any other person or entity within or outside of the vehicle. The term "entity" relates here to any biological and non-biological life form, material and/or machine, which can gather the signals with which the vehicle is conveying information and/or induces some kind of action based on this signals. This can comprise for example a device, for example a mechanical, electromechanical, electronic, electromagnetic, optical, chemical or biological device and/or any combination thereof, for example a computer, a robot, an artificial intelligence, but also an animal and/or a plant.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the disclosure or the appended claims. Further, it should be understood that any one of the features can be used separately or in combination with other features. Other systems, methods, features, and advantages of the disclosure will be or become apparent to one with skill in the art upon examination of the detailed description. It is intended that all such additional systems, methods, features, and advantages be included within this description, be within the scope of the present disclosure, and be protected by the accompanying claims.

Figure 1:
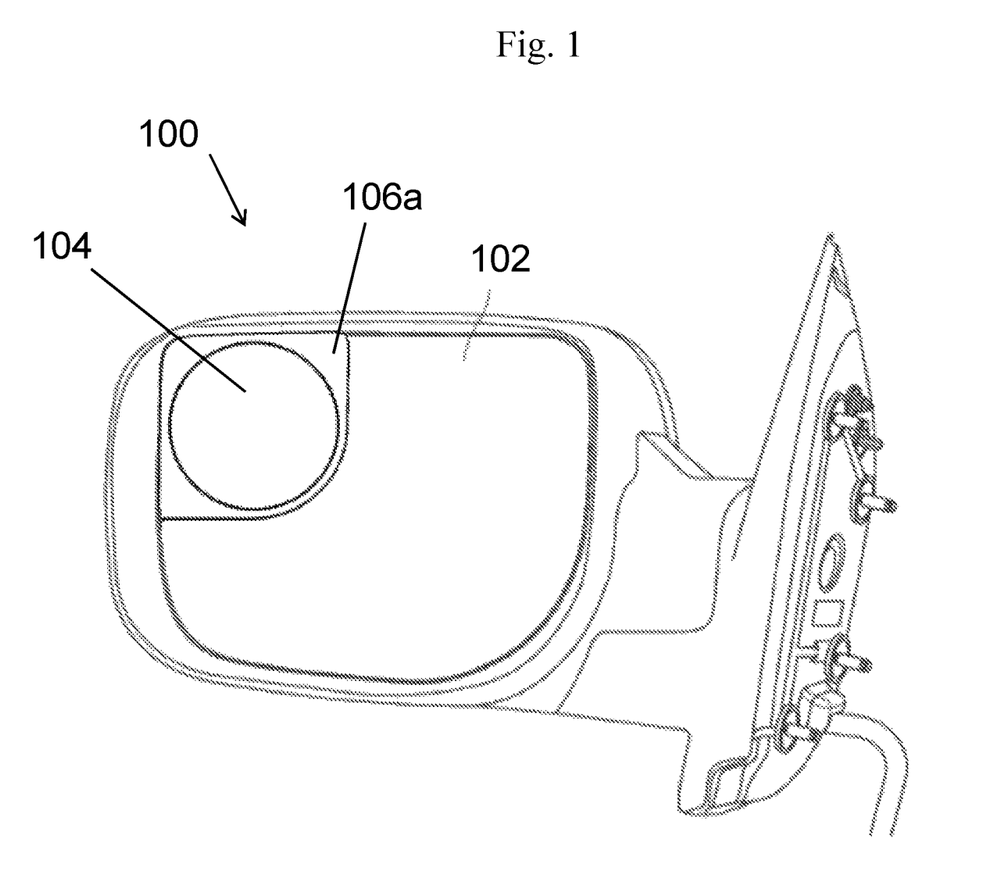
FIG. 1 illustrates an example of a vehicle rearview device with a primary and secondary reflective element according to the present disclosure.

FIG. 1 illustrates an example of a vehicle rearview device 100 with a primary reflective element (102) and secondary reflective element (104). The secondary reflective element (104) is also commonly referred to as a "spotter" and has a wider field of view than the primary reflective element (102). The primary reflective element (102) may be a mirror glass coated with a chrome or silver layer. The primary reflective element (102) may also include other known rear view devices such as a display, an LED screen, and an LCD screen. In this example, the secondary reflective element (104) may be either (1) a glass or reflective element and a backing plate or (2) a uniform singular plastic part with a reflective coating such as a chromium based coating applied to it as described throughout this application. The secondary reflective element backing plate (106) has an exposed perimeter framing portion (106a) and a mounting portion (106b) (illustrated in FIG. 3).

In an example, the chromium-based reflective coating is applied to provide the primary or secondary reflective elements. Further details on the coating is described in U.S. patent application Ser. No. 15/439,188, which is herein incorporated by reference in its entirety for all purposes. In the preferred form, the primary reflective element (102) and the secondary reflective element (104) are provided on two separate backing plates that are attached to one another in one or more different ways and using one or more different attachment mechanisms. In another form, the primary reflective element (102) and the secondary reflective element (104) may be provided as a two separate coatings on a single backing plate.

Figure 2:
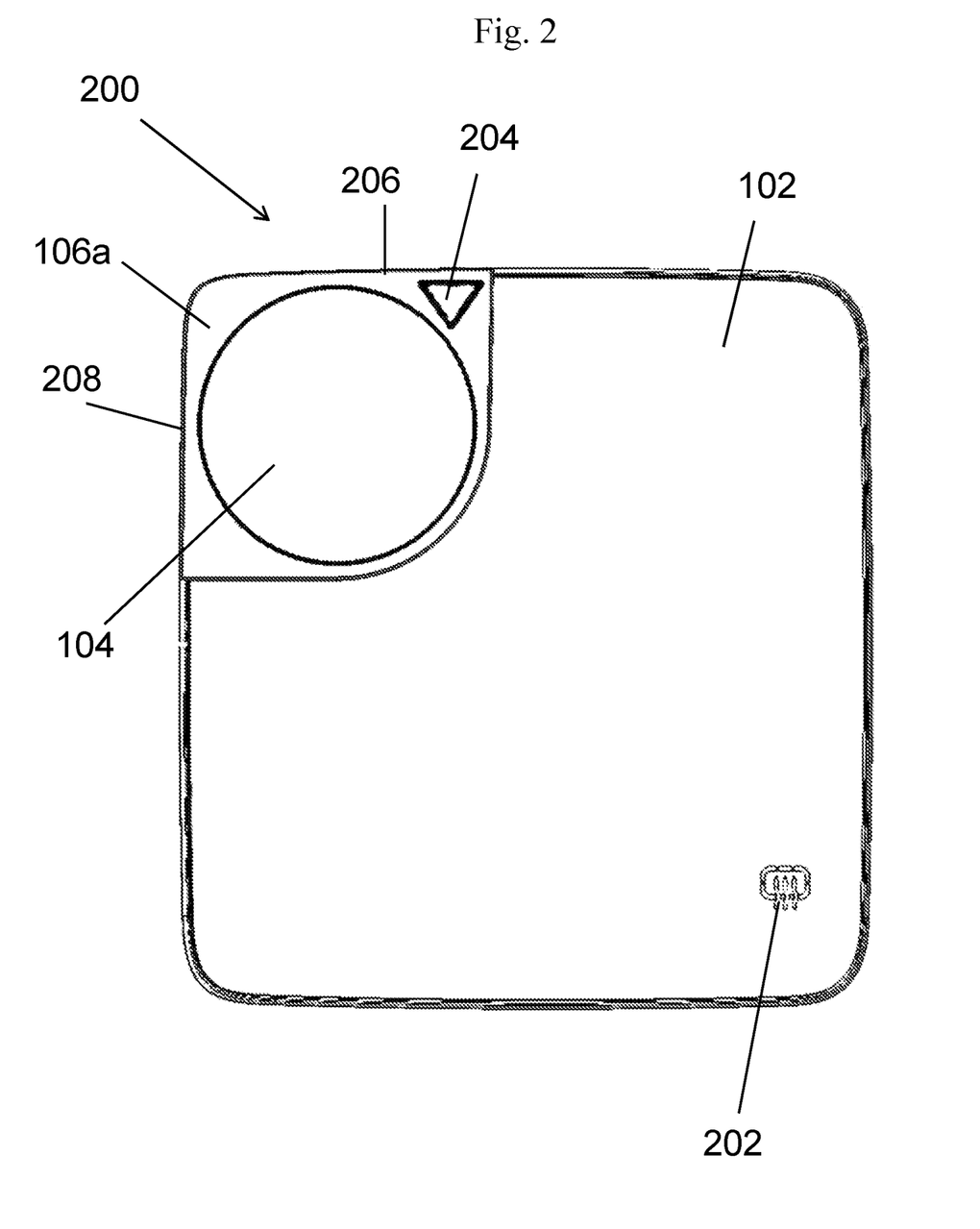
FIG. 2 illustrates a rear view of a reflective element assembly with the primary and secondary reflective elements according to the present disclosure.

FIG. 2 illustrates an exemplary rear view of a reflective element assembly (200) with the primary reflective element (102) and secondary reflective element (104). The reflective element assembly (200) may also include a primary light element (202) which may be used to project indicia through the primary reflective element (102) such as words, symbols, or logos as non-limiting examples. The primary light element (202) may also be used to fulfill functions for warning or indication to the driver such as blind spot warning or as turn signal indicator lights.

The secondary reflective element (104) shown in this form has a circular shape and may have a single radius of curvature, multiple radii of curvatures or be aspheric. In other forms, the shape of the secondary reflective element (104) may be chosen to provide the desired field of view. The secondary reflective element (104) may be fabricated as a piece of glass with metallic coating, or as a polymeric material with reflective coating, or as a highly polished metal material which is then fixedly attached to the secondary reflective mounting. The secondary reflective element (104) possesses one unit of magnification that can range from 150 mm spherical radius to 500 mm spherical radius.

As illustrated in FIG. 2, the secondary reflective element backing plate (106) (best seen in FIG. 3) has a perimeter framing portion (106a) extending beyond the edges of the secondary reflective element (104). The perimeter framing portion (106a) frames the secondary reflective element (104) providing visual separation between the primary reflective element (102) and the secondary reflective element (104). The perimeter framing portion (106a) has a first edge (206) and a second edge (208) which may be defined by the geometry of the primary reflective element (102) to provide a seamless integration for the outside contour for the reflective element assembly (200). In other forms, the first edge (206) and the second edges (208) may have a different outside contour in relationship to the primary reflective element (102). The exposed perimeter framing portion (106a) may have a grained or textured surface finish and may include text or a logo. The secondary reflective element backing plate (106) may also include a secondary light element (204) on the perimeter framing portion (106a). In this form, the secondary light element (204) may be used to project indicia such as words, symbols, or logos as non-limiting examples through the perimeter framing portion (106a). The secondary light element (204) may be used to fulfill functions for warning or indication to the driver such as blind spot warning or as turn signal indicator lights. In one form, the primary light element (202) may display in conjunction with the secondary light element (204). In another form the primary light element (202) and the secondary light element (204) may have separate functions and display independently.

Figure 3:
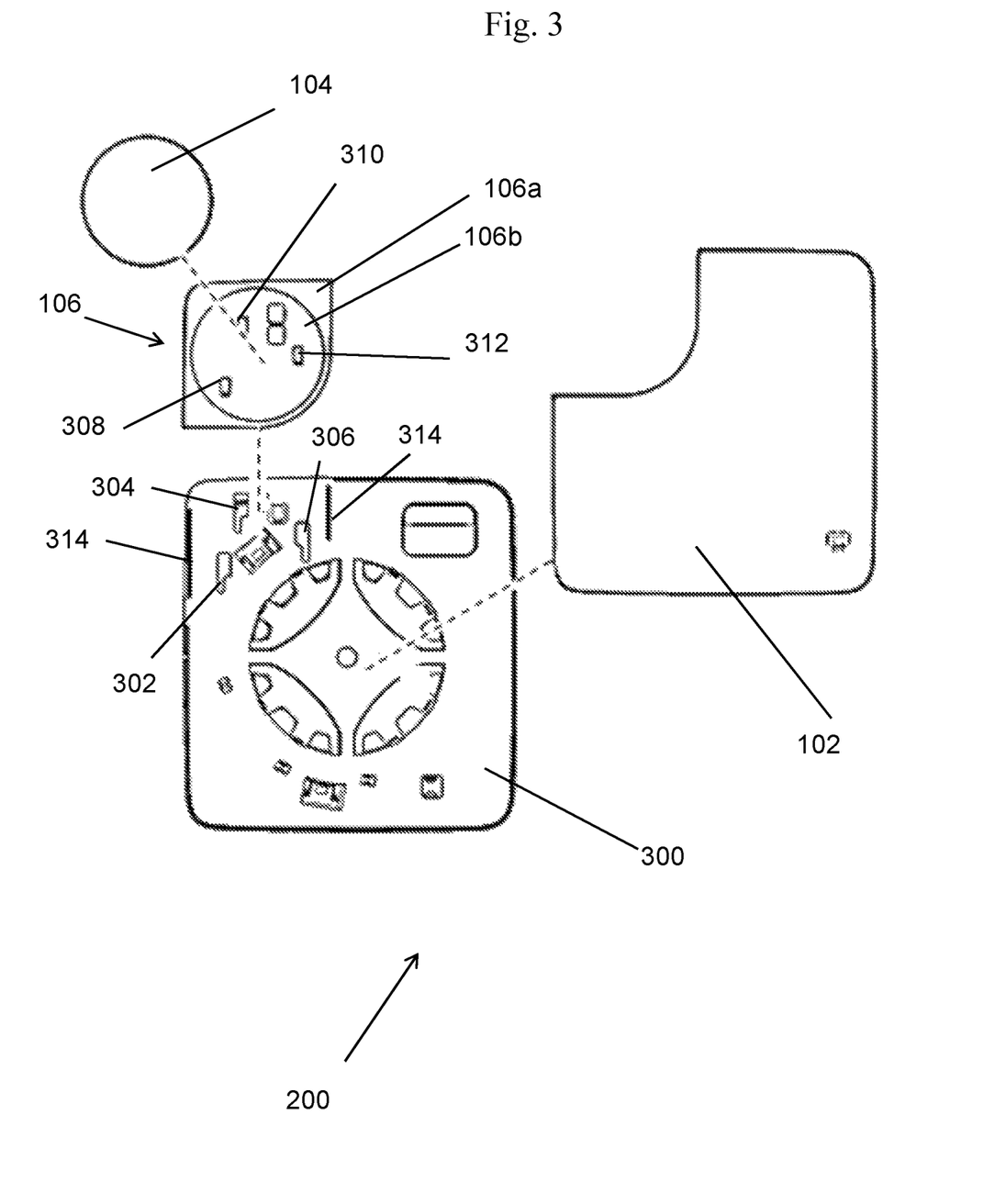
FIG. 3 illustrates an exploded rear view of the attachment of the primary and secondary reflective elements according to the present disclosure.

FIG. 3 illustrates an exploded rear view of the reflective element assembly (200). The primary reflective element (102) is attached to a primary reflective element backing plate (300). The secondary reflective element (104) is fixably attached to the secondary reflective element backing plate (106) in the mounting portion (106b) using an adhesive pad, a heating element or at least one clip (not shown). The secondary reflective element backing plate (106) contains at least one clip to provide attachment to at least one aperture on the primary reflective element backing plate (300). In this form, the secondary reflective element backing plate has three clips (308, 310, 312) which are received in corresponding apertures (302, 304, 306) on the primary reflective element backing plate (300). In other variations, the secondary reflective element backing plate (106) may be attached to the primary reflective element backing plate by snaps or adhesive pad. In this form, the geometry of the primary reflective element (102) cooperates with the geometry of the secondary reflective element backing plate (106) to align to the geometry of the primary reflective element backing plate (300). The primary reflective element backing plate (300) has at least one alignment rib (314) for guiding the assembly of the secondary reflective element backing plate (106) to the primary reflective element backing plate (300). In this form, there are two alignment ribs (314) to provide assembly guidance. The action of installing the secondary reflective element backing plate (106) involves inserting it into the primary reflective element backing plate (300) in a relative position that is higher than its final position. The secondary reflective element backing plate (106) is then slid downward, thus engaging the clips (308, 310, and 312). The at least one alignment rib (314) guides the secondary reflective element backing plate (106) when it is moving downward during the engagement process. After the secondary reflective element backing plate is attached to the primary reflective element backing plate, the secondary reflective element backing plate and the primary reflective element backing plate move together in unison with an actuator such that movement of the actuator simultaneously and similarly moves the primary reflective element and the secondary reflective element. The primary reflective element may also contain a perimeter framing portion corresponding to the primary reflective element.

Figure 4:
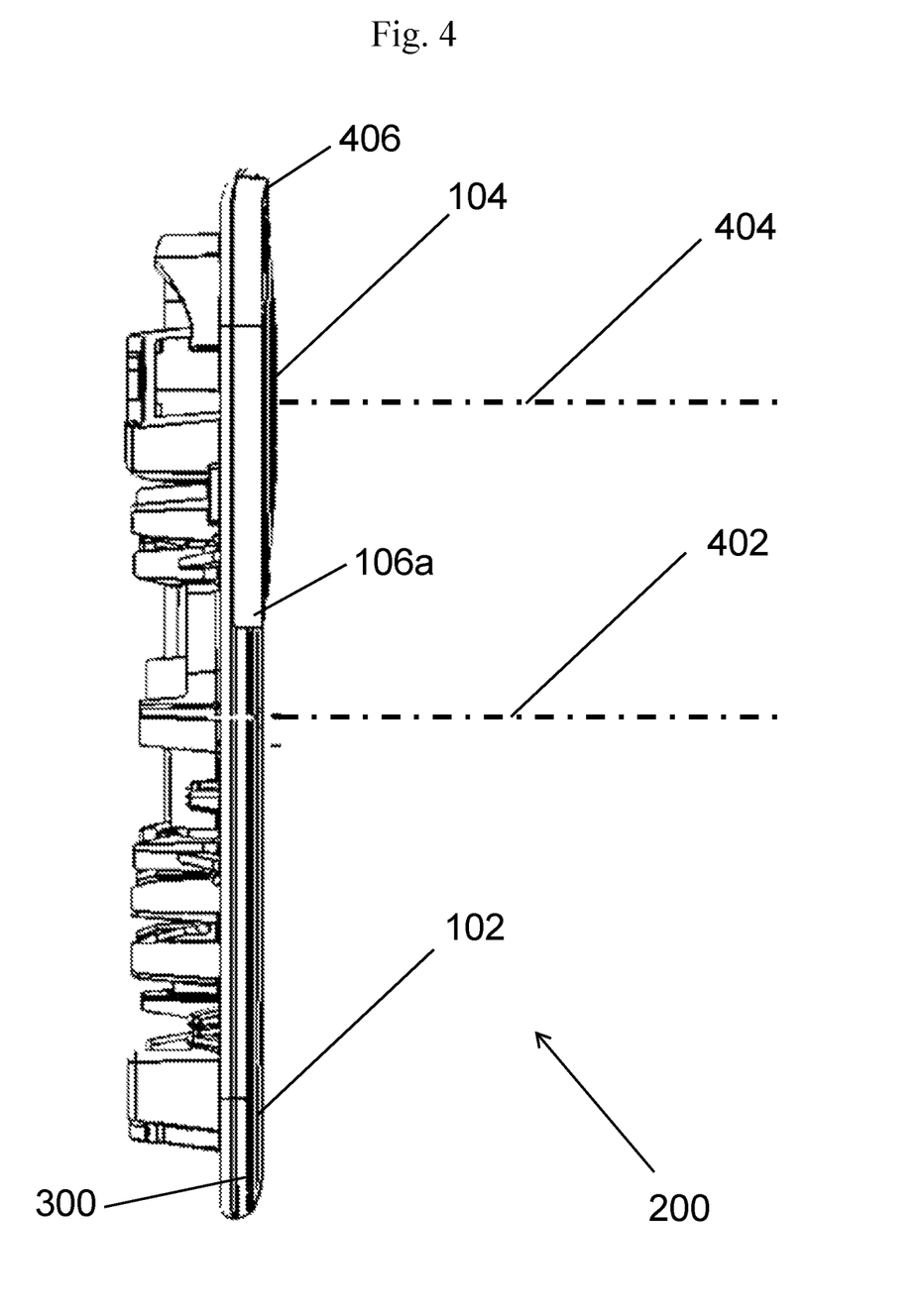
FIG. 4 illustrates a side view of the attachment of the primary and secondary reflective elements.

FIG. 4 illustrates a side view of the assembled reflective element assembly (200). A secondary reflective element central axis (404) of the secondary reflective element (104) is defined when mounted to the secondary reflective element backing plate (106). The primary reflective element (102) when attached to the primary reflective element backing plate (300) has a primary reflective element central axis (402). In one form, when the primary reflective element (102) is planar, the primary reflective element central axis (402) is defined as the axis which emanates perpendicular to the main glass when it is flat. In another form, when the primary reflective element (102) has a curvature to it, the main axis is the axis that emanates perpendicular to the glass at the glass mid-point or center of gravity. The secondary reflective element backing plate (106) is attached to the primary reflective element backing plate (300) such that the secondary reflective element central axis (404) is approximately parallel to primary reflective element central axis (402).

Illustrated in FIG. 4 is a rear surface (406) of the perimeter framing portion (106a). In this form, the viewing surface of the secondary reflective element (104) extends beyond the rear surface (406). The rear surface (406) approximately corresponds to the placement of the viewing surface of the primary reflective element (102). This arrangement provides for a seamless transition between the perimeter framing portion (106a) and the primary reflective element (102). In other forms the rear surface (406) may extend beyond the viewing surface of the secondary reflective element (104). In this variation, the rear surface (406) would provide protection for the spotter mirror surface such as with the use of an ice scrapper across the viewing surface of the primary reflective element (102).

In another variation, the primary reflective element backing plate (300) and the secondary reflective element backing plate (106) may be formed as a single integral backing plate. In this variation, the secondary reflective element (104) may fixably attached to the single integral backing plate such that the secondary reflective element central axis (404) of the secondary reflective element (104) is approximately parallel to the primary reflective element central axis (402) of the primary reflective element (102). In another variation, the secondary reflective element (104) and the secondary reflective element backing plate may be molded as a single unit to which different reflective coatings are applied.

Figure 5:
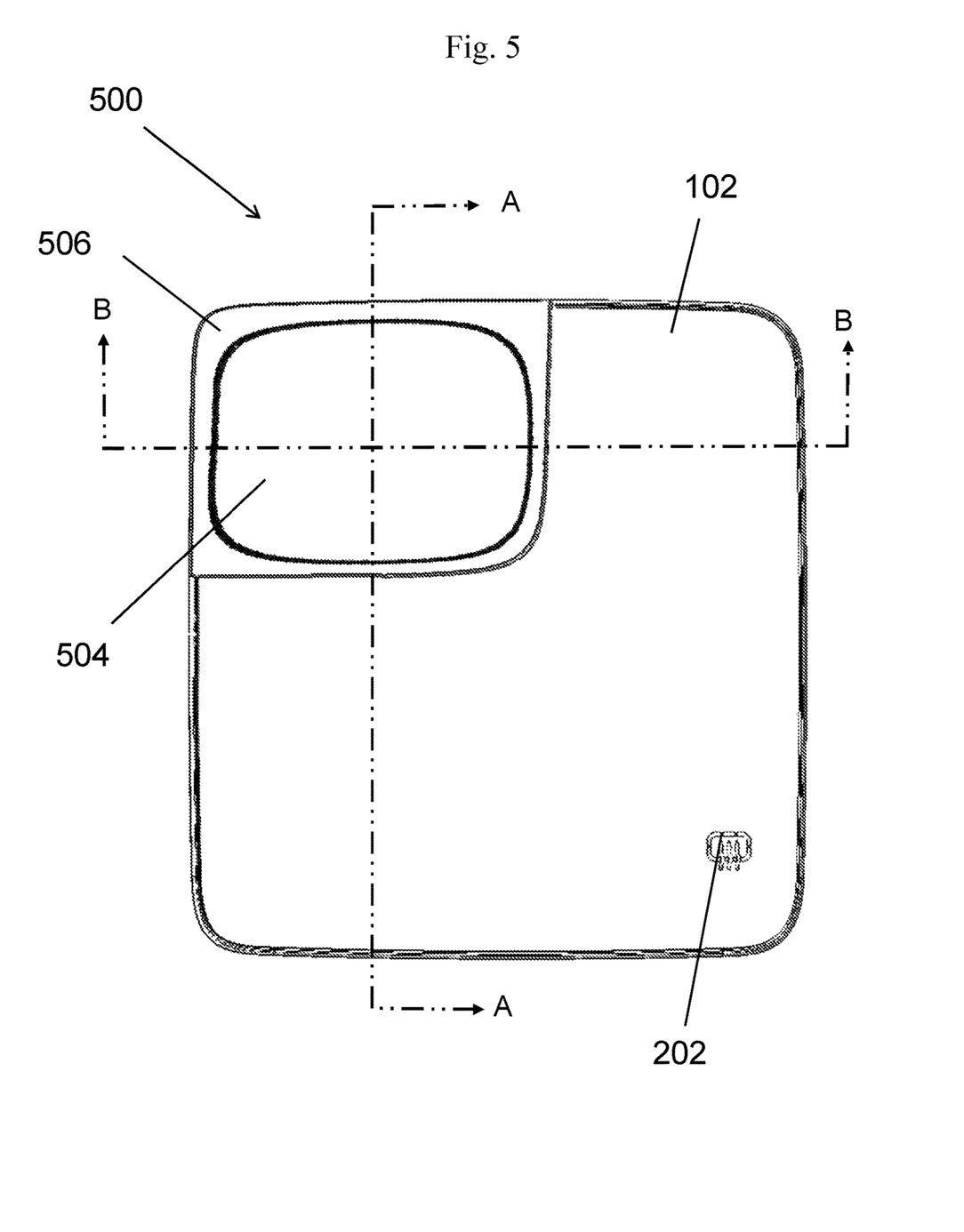
FIG. 5 illustrates a rear view of a primary reflective element with an example of a secondary reflective element.
Figure 6:
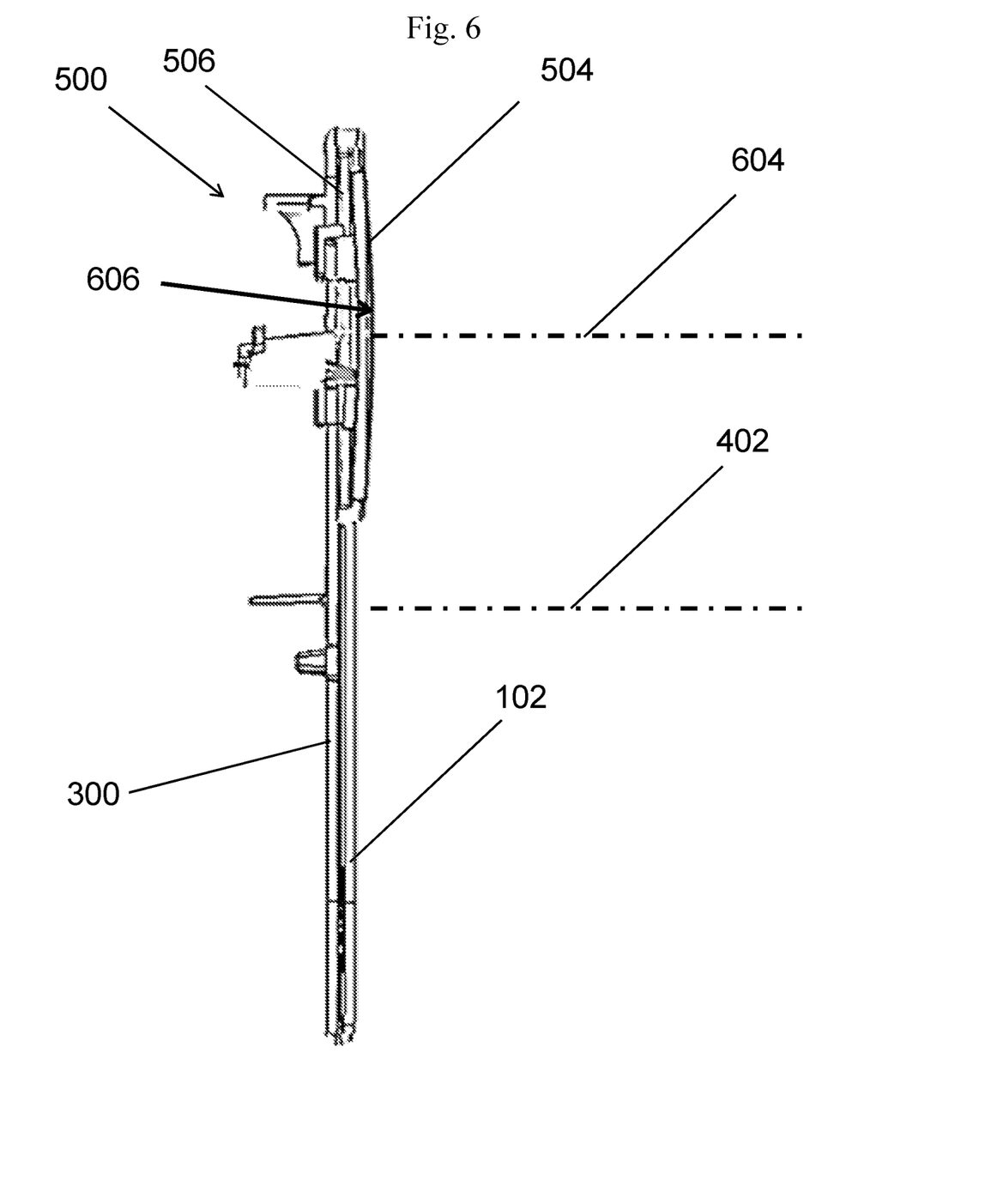
FIG. 6 illustrates a cross section along Section A-A of FIG. 5.
Figure 7:
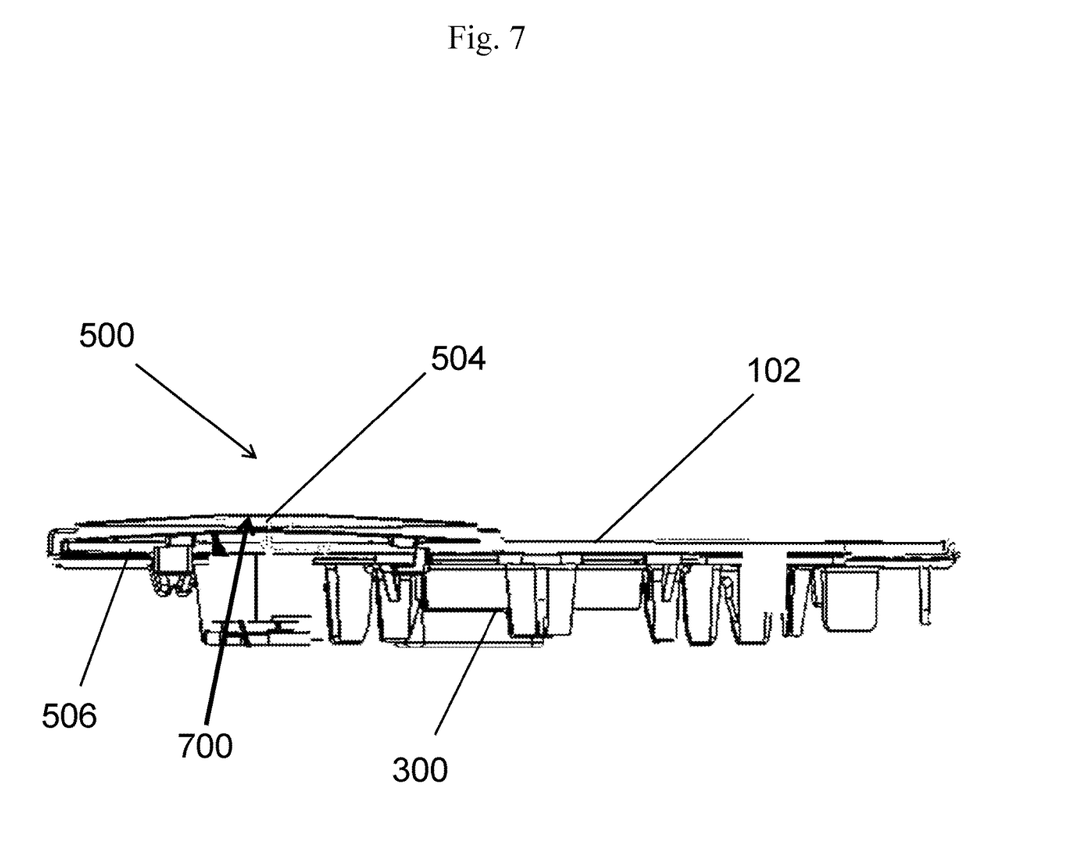
FIG. 7 illustrates a cross section along Section B-B of FIG. 5.

FIG. 5-7 illustrates a reflective element assembly (500) with a secondary reflective element (504) known as a spotter mirror. The secondary reflective element (504) has a secondary reflective element backing plate (506) with corresponding geometry and an exposed perimeter framing portion extending beyond the edges of a secondary reflective element (504). The primary reflective element (102), the primary reflective element backing plate (300), and primary light element (202) have the same characteristics of the corresponding elements as described in reference to FIG. 1-4 above and for purposes of brevity, the details will not be discussed again here. The secondary reflective element backing plate (506) has geometry corresponding to the secondary reflective element (504). The characteristics of the secondary reflective element backing plate (106) describe in reference to FIG. 1-4 apply to the secondary reflective element backing plate (506) and will not be repeated here. The secondary reflective element 504 in this form has a different geometry shape with multiple curvatures but other characteristics are common to the secondary reflective element (104) described in FIG. 1-4. FIG. 5 defines a first cross section line A-A illustrated in FIG. 6 and a second cross-section line B-B illustrated in FIG. 7.

FIG. 6 illustrates a first radius of curvature (606) for the secondary reflective element (504). A secondary reflective element central axis (604) of the secondary reflective element (504) is defined when mounted to the secondary reflective element backing plate (506). The primary reflective element (102) when attached to the primary reflective element backing plate (300) has a primary reflective element central axis (402). The primary reflective element central axis (402) is defined as described above in relation to FIG. 4. The secondary reflective element backing plate (506) is attached to the primary reflective element backing plate (300) such that the secondary reflective element central axis (604) is approximately parallel to primary reflective element central axis (402). In other forms, the primary axis of the secondary reflective element (504) may be tipped outward or downward.

FIG. 7 illustrates a second radius of curvature (700) for the secondary reflective element (504). By utilizing the first and second radius of curvatures (606, 700) the image viewed in the secondary reflective element (504) may be optimized. It is known as a disadvantage that a secondary reflective element tends to display the rear view image to the driver in a reduced magnification such that the image of the vehicle in the blind spot appears small to the driver. It is also a known disadvantage that a secondary reflective element with a single unit of magnification required to see laterally into the blind spot provides excessive field of view vertically, above and below a blind spot target. By utilizing a multi-radius secondary reflective element 502, the first radius of curvature (606) may be a greater value than the second radius of curvature (700). The range of first radius of curvature (606) is a vertical radius of curvature and may be from 275 mm to 500 mm. The second radius of curvature (700) is a horizontal radius of curvature and may be from 150 mm to 375 mm. In this manner the image of the vehicle in the secondary reflective element (504) presented to the driver will be larger. The ratio of the vertical first radius of curvature (606) to the horizontal second radius of curvature (700) can range from 1.1/1.0 to 3.3/1.0.

In the above examples, the reflective elements may be secured to each of the backing plates with an adhesive pad (not shown). They may also be adhered to the backing plates with heating element that has adhesive on both sides (not shown). The adhesive pads and/or heating element pads used to secure the reflective elements to the resin polymeric resin backing plates may be independent and two piece, or a single piece pad or heating element may be used similar to that which is disclosed in U.S. Pat. No. 8,047,665, which is herein incorporated by reference for all purposes. The attachment of the secondary reflective element to the primary reflective element backing plate may also as described in U.S. Pat. No. 10,723,268 REAR VIEW DEVICE WITH MULTI-PIECE BACKING PLATE which incorporated herein by reference.

In all examples, the blind spot reflective element is shown in the upper outboard corner of the mirror housing. However, this disclosure includes embodiments where the blind spot reflective element is on the outboard portion of the housing or the lower portion of the housing, among other positions. Further to the above described examples, preferred dimensions for the radius of curvature may vary between the curved mirror or rear view means and a substantially flat mirror or rear view means. For example, to achieve a wider field of view, the curved mirror may have a radius of curvature that is between 150 mm and 2000 mm. The flat mirror may be entirely flat or may be slightly curved having a significantly larger radius of curvature. In addition, a flat mirror includes a mirror which provides a user with a one to one ratio of magnification. That is, the viewed image may be the same dimensions as the actual image with a 2% plus or minus degree of distortion. In addition, as described in multiple embodiments above, the secondary reflective element may be tilted with respect to the primary reflective element or flat mirror. Also, both reflective elements may be selectively adjustable by an actuator or manually by a user, being both adjustable together and separately with respect to one another.

As used herein, the terms outwardly refers to tilting the mirror away from the door of the vehicle, inwardly refers to tilting the mirror toward the door of the vehicle, upwardly refers to tilting the mirror toward the sky, and downwardly refers to tilting the mirror toward the surface of the road. The rearview device can also be equipped with different illumination devices. Different functions and devices can be incorporated into and/or controlled with the help of rearview devices including especially also cameras. Especially useful are functions and devices to enhance, extend and/or sustain the functionality of the rearview device during normal or extreme conditions. This may include heating and/or cooling means, cleaning means such as wipers, liquid and/or gaseous sprays, actuator means for moving the rearview device or parts of it, such as for example a display, a camera system and/or parts of a camera system, including for example lenses, filters, light sources, adaptive optics like deformable mirrors, sensors and/or mirrors, and/or actuator means for inducing movement of other objects, for example parts of the vehicle and/or objects surrounding the vehicle. Furthermore it can include linear tracks and/or rotating wheels, like for example a filter wheel, for exchanging optical elements, including for example lenses, mirrors, light sources, sensors, and adaptive optics like deformable mirrors and/or filters.

Prominent examples for functions and devices incorporated into and/or controlled with the help of rearview devices include also illumination devices, for example any kind of light module like an external light module, an internal light module, a front light, a back light, a fog light, a brake light, an acceleration light, a turn signal, a logo lamp, a puddle light, a flash light, a navigation light, a position light, an emergency light, a spotlight, a green light, a red light, a warning light, a turn signal light module, an approach light, a searchlight, an information light, a display and/or any combination thereof. Further examples for functions and devices incorporated into and/or controlled with the help of rearview devices may include for example a tiredness detection system, a microsleep detection system, a distance and/or velocity determination system, for example a LIDAR (Light detection and ranging) system, a blind spot indicator system, a lane change assistant system, a navigation assistant system, a tracking assistant system, a human-machine interaction system, a machine-machine interaction system, an emergency and precaution assistant system, like an accident avoiding assistant system, a counter-measures assistant system, a brake assistant system, a steering assistant system, an acceleration assistant system, an escape assistant system, including for example an ejection seat system, a direction indicator, a blind spot indicator, an approach system, a strong braking U.S. Pat. No. 10,723,268 B2system, an emergency braking system, a charging status indicator, a vehicle mode system, including for example a sports mode system, an economy mode system, an autonomous drive mode system, a sleep mode system and an anti-theft system, a vehicle locked indicator system, a vehicle stolen indicator, a warning signal system, a temperature indicator system, a weather indicator system, a traffic light signal system, a fuel status system and/or any combination thereof. An example for a rearview device including an illumination device fulfilling the brake light functions is disclosed in German patent application No. 102012108488, filed on Sep. 11, 2012 for REARVIEW ASSEMBLY FOR MOTOR VEHICLE and hereby incorporated herein by reference. Alight guidance unit for an illumination device used in a back vision system is disclosed in German patent application No. 102012104529, filed on May 25, 2012 for LIGHT GUIDANCE UNIT which is hereby incorporated herein by reference. An illumination device for a rearview device is disclosed in German patent application No. 102012107833, filed on Aug. 24, 2012 for ILLUMINATION DEVICE AND REARVIEW DEVICE which is hereby incorporated herein by reference. A lighting device for a back-vision unit is disclosed in German patent application No. 102012107834, filed on Aug. 24, 2012 for LIGHTING DEVICE AND BACK-VISION UNIT which is hereby incorporated herein by reference. A housing and display device of a rearview device is disclosed in European patent No. 2738043, filed on Dec. 3, 2012 for HOUSING AND DISPLAY DEVICE which is hereby incorporated herein by reference. An optical light guide for a vehicle lighting unit is disclosed in European patent No. 2947378, filed on May 22, 2014 for OPTICAL LIGHT GUIDE FOR A VEHICLE LIGHTING UNIT which is hereby incorporated herein by reference. A display device of a rearview device of a vehicle is disclosed in International patent application No. 2015/173695, filed on May 7, 2015 for DISPLAY DEVICE, REAR VIEW DEVICE AND MOTOR VEHICLE and claiming priority to European patent application No. 2944866, filed on May 12, 2014 for OPTICAL UNIT, DISPLAY DEVICE, REARVIEW DEVICE AND MOTOR VEHICLE INCLUDING THE SAME which are all hereby incorporated herein by reference.

Further a light guiding device for an illumination device, in particular for a motor vehicle or a display device, in a rearview device of a motor vehicle is disclosed in European patent application No. 3045944, filed on Jan. 19, 2015 for LIGHT GUIDING DEVICE which is hereby incorporated herein by reference. Still further a light guiding device for an illumination device, especially for a motor vehicle or an indicator device in a rearview device of a motor vehicle is disclosed in U.S. patent application Ser. No. 15/228,566, filed on Aug. 4, 2016, for LIGHT GUIDING DEVICE and is a continuation-in-part of U.S. patent application Ser. No. 15/000,733, filed on Jan. 19, 2016 for LIGHT GUIDING DEVICE which are all hereby incorporated herein by reference. In addition, an illumination device, particularly for a rear-view device of a motor vehicle and a method for producing the same are disclosed in International patent application No. 2016/147154, filed on Mar. 18, 2016 for ILLUMINATION DEVICE AND METHOD FOR PRODUCING AN ILLUMINATION DEVICE and claiming priority to German patent application No. 102015104163, filed on Mar. 19, 2015 for ILLUMINATION DEVICE AND METHOD FOR PRODUCING AN ILLUMINATION DEVICE which are all hereby incorporated herein by reference. An improved rear-view device for a motor vehicle which includes an electronic device is disclosed in U.S. patent application Ser. No. 15/256,532, filed on Sep. 3, 2016 for ELECTRONIC DEVICE AND REAR-VIEW DEVICE and claiming priority to European patent application No. 3139711, filed on Sep. 3, 2015 for ELECTRONIC DEVICE AND REAR VIEW DEVICE which are all hereby incorporated herein by reference. A lighting device for a rearview device or a footwell device of a vehicle, including at least one luminous means is disclosed in German patent application No. 102015115555, filed on Sep. 9, 2015 for ILLUMINATION DEVICE, REAR VIEW DEVICE, FOOTWELL DEVICE AND VEHICLE which is hereby incorporated herein by reference. A light module for a light assembly of an exterior rear view device is disclosed in European patent application No. 3138734, filed on Sep. 3, 2015 for LIGHT MODULE, LIGHT ASSEMBLY AND REAR VIEW DEVICE FOR A VEHICLE which is hereby incorporated herein by reference. A lighting device for a vehicle component, in particular for a rearview device of a motor vehicle, including a logo lamp and a deflection mirror are disclosed in European patent application No. 3144183, filed on Sep. 13, 2016 for LIGHTING DEVICE, VEHICLE COMPONENT AND VEHICLE and claiming priority to German utility patent application No. 202015104894, filed on Sep. 15, 2015 for LIGHTING DEVICE, VEHICLE COMPONENT AND VEHICLE which are all hereby incorporated herein by reference.

A camera module can include in particular a plurality of different optical elements, including a variety of sensors and light sources, as well as housing parts. The housing of a camera module can be made out of plastic, metal, glass, any other suitable material and/or any combinations thereof and can be used in combination with the techniques described below to change or modify the properties of the material or the material surface. Housings are for example described in German patent application No. 102016108247.3, filed on May 3, 2016 for CLEANING SYSTEM FOR A CAMERA and U.S. patent application Ser. No. 15/281,780, filed Sep. 30, 2016 for TELESCOPING REAR VIEW ASSEMBLY WITH CAMERA AND LENS 40 WIPING SYSTEM, which are all hereby incorporated herein by reference. The camera can include for example CCD or CMOS or light field sensors, as for example described in German patent application No. 102011053999, filed Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED AS LIGHT FIELD SENSOR FOR DETECTION and U.S. patent application Ser. No. 09/771,140, filed on Jan. 26, 2001 for MONITORING DEVICE FOR VEHICLES, IN PARTICULAR, MOTOR VEHICLES, now U.S. Pat. No. 6,703,925, which are all hereby incorporated herein by reference. Also an area of the sensor can be reserved for different purposes, for example to detect a test beam, as described in U.S. Pat. No. 8,031,224, filed on Sep. 9, 2014 for CAMERA SYSTEM, METHOD FOR OPERATION OF A CAMERA SYSTEM AND SENSOR DEVICE OF A CAMERA SYSTEM, which is hereby incorporated herein by reference. The optical elements can be molded or formed from any type of glass or any other suitable material. Glass is here used in the meaning of a non-crystalline amorphous solid showing a glass transition when heated towards the liquid state. It includes for example the group of polymeric glasses, metallic glasses, silica glasses, but any other suitable material showing the glass transition can also be used. The glass U.S. Pat. No. 10,723,268 B2 can be either in a flat, wedge, rectangular, cylindrical, spherical, conical, elliptical, and/or circular shape, as described for example in German patent application No. 102016108247.3, and German patent application No. 102011103200, filed on May 31, 2011 for LIGHT WINDOW FOR USE AS LIGHT CONDUCTOR FOR TURN INDICATOR IN OUTSIDE MIRROR ARRANGEMENT OF VEHICLE, HAS UNCOUPLING STRUCTURES AT CERTAIN LOCATION OF WINDOW, AND OPTICAL FILM WITH MOLDED COATING AND PROVIDED WITH UNCOUPLING STRUCTURES, which are all hereby incorporated herein by reference, or have a shape according to different needs or lens types. As non-limiting examples camera modules can be equipped with lenses, like a wide-angle or fish-eye lens suitable to provide peripheral images, as described in U.S. patent application Ser. No. 15/281,780, and U.S. patent application Ser. No. 13/090,127, filed on Apr. 19, 2011 for REAR VIEW MIRROR SIMULATION, now U.S. Pat. No. 9,238,434, a Fresnel lens or micro lenses as described in German patent application No. 102011053999, filed Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED A SLIGHT FIELD SENSOR FOR DETECTION, and a TIR (total internal reflection) lens as described in U.S. Pat. No. 8,740,427, filed Sep. 8, 2010 for OPTIMAL LIGHT COUPLING FOR REAR VIEW DEVICES, which are all hereby incorporated herein by reference. Another type of optical elements know to be used in camera modules are optical fibers, especially in form of fiber bundles and preferably inform of fiber bundles having an optical head, as described for example in U.S. patent application Ser. No. 09/771,140. Different methods can be used to produce such optical elements, for example as described in U.S. Pat. No. 8,460,060, filed on Jan. 30, 2009 for METHOD FOR CREATING A COMPLEX SURFACE ON A SUBSTRATE OF GLASS, which is hereby incorporated herein by reference.

The optical elements can be transparent as described for example in U.S. Pat. No. 8,031,224, German patent application No. 102016108247.3, and U.S. patent application Ser. No. 13/242,829, filed Sep. 23, 2011 for CAMERA ARRANGEMENT AND DOOR HANDLE FOR MOTOR VEHICLE, which are all hereby incorporated herein by reference. But the optical elements can also be semitransparent, as described in U.S. patent application Ser. No. 09/771,140 and U.S. patent application Ser. No. 13/090,127, which are all hereby incorporated herein by reference. Still further, the optical elements can be completely or partially coated with different type of coatings to realize different effects, such as for example anti-reflective coatings as described in U.S. Pat. No. 8,031,224, chromium-based reflective coatings as described in U.S. Pat. No. 9,181,616, filed on Jan. 24, 2012 for CHROMIUM-BASED REFLECTIVE COATING, and other coatings, for example for polymeric substrates as described in U.S. patent application Ser. No. 14/936,024, filed on Nov. 9, 2015 for COATED POLYMERIC SUBSTRATES and in U.S. patent application Ser. No. 15/124,310, filed on Feb. 20, 2015 for DECORATIVE COATINGS FOR PLASTIC SUBSTRATES, which are all hereby incorporated herein by reference. Preferably the optical elements are made of a scratch-proof material as described for example in German patent application No. 102016108247.3, which is hereby incorporated herein by reference. The optical elements can have uncoupling structures at certain locations of the optical elements, and an optical film, for example an extrusion film, and a molded coating can be applied as described in German patent application No. 102011103200, which is hereby incorporated herein by reference. A coating to spectrally and stress control is described in U.S. patent application Ser. No. 15/124,310, which is hereby incorporated herein by reference. Different filters can be integrated into the optical elements such as for example gray filters or polarization filters, described in U.S. patent application Ser. No. 14/809,509, filed Jul. 27, 2015 for APPARATUS FOR LIGHT INTENSITY ADJUSTMENT, which is hereby incorporated herein by reference.

Electrochromic substrates, polymer electrolytes and other charge conducting medias may be used for the optical elements based on the descriptions of European patent application No. 08103179.1, filed on Mar. 31, 2008 for PROCESS FOR PRODUCING ELECTROCHROMIC SUBSTRATES AND ELECTROCHROMIC ARTICLES MADE THEREFROM, European patent No. 2202826, filed on Dec. 23, 2008 for POLYMER ELECTROLYTES AND DEVICES CONTAINING, U.S. Pat. No. 7,999,992, filed on Jan. 7, 2005 for CHARGE CONDUCTING MEDIUM and U.S. Pat. No. 8,537,451, filed on Mar. 26, 2008 for PROCESSES FOR PRODUCING ELECTROCHROMIC SUBSTRATES AND ELECTROCHROMIC ARTICLES MADE THEREFROM, which are all hereby incorporated herein by reference.

The camera module can also be equipped with apparatuses for light intensity adjustment as described for example in U.S. patent application Ser. No. 14/809,509 and light level intensifier tubes as described in U.S. patent application Ser. No. 09/771,140, which are all hereby incorporated herein by reference. The electrochromic substrates and devices used in European patent application No. 08103179.1, European patent No. 2202826, U.S. Pat. Nos. 7,999,992 and 8,537,451, which are all hereby incorporated herein by reference, can also be used for this purpose as well as a transfiector to transmit or reflect light based on a corresponding input signal, as described in German patent application No.

102016106126.3, filed on Apr. 4, 2016 for IMAGING SYSTEM, which is hereby incorporated herein by reference.

The camera module or a cover adapted to the camera module can be moved using different actuators, drives and/or a flexible track, as for example described in German application No. 102016108247.3 and U.S. patent application Ser. No. 15/281,780, which are all hereby incorporated herein by reference.

Still further, the camera module can also include cleaning elements to clean the optical element facing outwards and being exposed to the environment. The cleaning element can for example include wipers, brushes, lips, nozzles, fans and similar elements as are described in European patent application No. 14165197.6, filed Apr. 17, 2014 for OPTICAL SYSTEM FOR A VEHICLE, CLEANING DEVICE AND VEHICLE COMPRISING AN OPTICAL SYSTEM, U.S. patent application Ser. No. 15/281,780, German patent application No. 102016108247.3, European patent application No. 13163677.1, filed Apr. 15, 2013 for LENS WIPER, European patent application No. 15173201.3, filed Jun. 22, 2015 for LENS CLEANING WITH FLEXIBLE ACTUATOR and European patent No. 1673260, filed on Oct. 14, 2003 for CLEANING DEVICE which are all hereby incorporated herein by reference. The cleaning devices are not limited in composition, and may for example include any fabric, elastomeric, sponge, brush, or combination of these. Special wiper elements including wiper arms, wiper blades, wiping cloth, wiping tissue and combinations thereof are U.S. Pat. No. 10,723,268 B2 described in European patent application No. 14165197.6, which is hereby incorporated herein by reference. A wiper element may for example be controlled according to the method described in European patent application No. 130164250.6, filed Apr. 18, 2013 for METHOD FOR CONTROLLING A WIPER DEVICE, which is hereby incorporated herein by reference. A reservoir for holding a cleaning liquid as described in European patent application No. 14165197.6, which is hereby incorporated herein by reference. Such a reservoir can be attached to or integrated into the camera module to provide the cleaning liquid to the optical elements of the camera module.

Different methods may be used to detect dirt or other obscurations preventing or reducing the functioning of the camera module, such as described in U.S. Pat. No. 8,395,514, filed on Jun. 24, 2008 for OPTICAL SYSTEM AND METHOD FOR DETECTING OPTICAL SYSTEM OBSCURATION IN A VEHICLE, European patent No. 1328141, filed on January 12, for ASSEMBLY HAVING A CONDUCTOR FROM FLEXIBLE MATERIAL AND METHOD FOR MANUFACTURING SUCH AN ASSEMBLY, and U.S. Pat. No. 8,031,224, which are all hereby incorporated herein by reference.

Also light sources can be installed or integrated into the camera module to increase the visibility of surrounding objects, measure distances and directions and detect dirt, such as described in U.S. Pat. No. 8,031,224, U.S. patent application Ser. No. 62/470,658, filed on Mar. 13, 2017, 2016 for LIGHT EMITTING MIRROR BEZEL and U.S. patent application Ser. No. 09/771,140, which are all hereby incorporated herein by reference.

Different heating means, like heating coils, heating devices integrated into the lens holder or the bezel, or other heating elements can be used to impede condensation and icing at the surface of optical elements, as for example described in German patent application No. 102016108247.3, U.S. patent application Ser. No. 62/470,658, and German patent application No. 102016107545.0, filed on Apr. 22, 2016 for HEATING DEVICE FOR A CAMERA LENS, which are all hereby incorporated herein by reference.

A watertight seal against weather effects, as well as against the influence of washing processes with detergents, solvents and high pressure cleaners can be used on the housing of the camera module as described in U.S. patent application Ser. No. 13/090,127, which is hereby incorporated herein by reference.

In another example, the housing can be made of a body including plastic and conductive material, wherein the conductive material is dispersed in the plastic material to forma conductive mass to allow a power source, preferably a DC voltage source, to connect via at least two electrodes to the body and heat the body accordingly, as described in German patent application No. 102016107545.0, which is hereby incorporated herein by reference.

A conductor track can be embedded within plastic parts of the camera module as described in European patent No. 1328141 and U.S. Pat. No. 7,083,311, filed on Jan. 12, 2002 for CONDUCTOR OF FLEXIBLE MATERIAL, COMPONENT COMPRISING SUCH FLEXIBLE CONDUCTOR, AND METHOD OF MANUFACTURING SUCH CONDUCTOR, which are all hereby incorporated herein by reference.

The camera module can include a power harvesting system as described for example in European patent application No. 09171683.7, filed on Sep. 29, 2009 for SELF SUSTAINING REAR VIEW MIRROR, which is hereby incorporated herein by reference.

A fault detection system for electric consumers as described in U.S. Pat. No. 8,487,633 filed on Jan. 14, 2010 for FAULT DETECTION OF ELECTRIC CONSUMERS IN MOTOR VEHICLES, which is hereby incorporated herein by reference, can be used to detect failure of the camera module.

Different types of fixings can be used to fix the camera module to the vehicle or other components, such as for example the snap-fit connection described in European patent No. 2233360, filed on Mar. 27, 2009 for SNAP FIT CONNECTION IN A REAR VIEW MIRROR, which is hereby incorporated herein by reference.

Different control means and analyzing devices can be used, such as the computation units described in U.S. patent application Ser. No. 13/090,127, German patent application No. 102016106126.3, German patent application No. 102011053999, European patent No. 2146325, filed on July 16, for Recording Device for Receiving, Processing and Storing Image Files in a Vehicle and Method, and U.S. Pat. No. 8,849,104, filed on Jul. 16, 2008 for RECORDING DEVICE AND METHOD FOR CAPTURING AND PROCESSING IMAGE DATA IN A VEHICLE, which are all hereby incorporated herein by reference. In addition, HDR (high dynamical range) technology can be used according to U.S. patent application Ser. No. 14/830,406, filed on Aug. 19, 2015 for REAR VIEW DEVICE FOR A MOTOR and published as US 20150358590, which is hereby incorporated herein by reference.

The foregoing description of various preferred embodiments have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated.

REFERENCE SIGNS

100—Rearview Device
102—Primary Reflective Element
104—Secondary Reflective Element
106—Secondary Reflective Element Backing Plate
106a—Perimeter Framing Portion
106b—Attachment Portion
200—Reflective Element Assembly
202—Primary Light Element
204—Secondary Light Element
206—First Edge
208—Second Edge
300—Primary Reflective Element Backing Plate
302—Aperture
304—Aperture
306—Aperture
308—Clip
310—Clip
312—Clip
314—Alignment Rib
402—Primary Reflective Element Central Axis
404—Secondary Reflective Element Central Axis
406—Rear Surface of the Perimeter Framing Portion
500—Reflective Element Assembly
504—Secondary Reflective Element
506—Secondary Reflective Element Backing Plate
604—Secondary Reflective Element Central Axis
606—First Radius of Curvature
700—Second Radius of Curvature

What is claimed is:

1. A rearview device for use with a vehicle, comprising:
a primary reflective element backing plate;
a primary reflective element positioned on the primary reflective element backing plate;
a secondary reflective element backing plate comprising a perimeter framing portion separating the primary reflective element from the secondary reflective element, the secondary reflective element backing plate further comprising a mounting portion;
a secondary reflective element positioned on the mounting portion of the secondary reflective element backing plate; and
an attachment mechanism comprising at least one clip or projection in the region of the mounting portion configured to attach the secondary reflective element backing plate to the primary reflective element backing plate,
wherein the attachment mechanism aligns a primary central axis of the primary reflective element to a secondary central axis of the secondary reflective element to be substantially parallel.

2. The rearview device of claim 1, wherein at least one of the primary reflective element backing plate and the secondary reflective element backing plate comprises a polymeric substrate, and
at least one of the primary reflective element comprises a chromium-based reflective coating applied to a surface of the primary reflective element backing plate and the secondary reflective element comprises a chromium-based reflective coating applied to a surface of the secondary reflective element backing plate.

3. The rearview device of claim 1, wherein a surface of the primary reflective element backing plate or the secondary reflective element backing plate is at least one of planar, curved, or convex shaped.

4. The rearview device of claim 3, wherein the surface of the primary reflective element backing plate has a different shape than the secondary reflective element backing plate.

5. The rearview device of claim 1, wherein each of the primary reflective element and the secondary reflective element comprises at least one of a coating, a chromium-based reflective coating, a reflective surface, a display, a screen, an LED screen, or an LCD screen.

6. The rearview device of claim 1, wherein the secondary reflective element is a spotter mirror providing a wider field of view than the primary reflective element.

7. The rearview device of claim 1, wherein the secondary reflective element is aspheric or spherical.

8. The rearview device of claim 1, wherein the secondary reflective element has a single radius of curvature or multiple radii of curvature.

9. The rearview device of claim 1, wherein the secondary reflective element is round in profile and possesses one unit of magnification which can range from 150 mm spherical radius to 500 mm spherical radius.

10. The rearview device of claim 1, wherein the secondary reflective element has a first radius of curvature from 275 mm to 500 mm and a second radius of curvature from 150 mm to 375 mm.

11. The rearview device of claim 1, wherein the perimeter framing portion is textured or grained.

12. The rearview device of claim 1, wherein the perimeter framing portion comprises at least one symbol, logo, text or light element.

13. The rearview device of claim 1, wherein the perimeter framing portion has a surface that extend beyond a viewing surface of the secondary reflective element.

14. The rearview device of claim 1, wherein the secondary reflective element backing plate and the primary reflective element backing plate move together in unison with an actuator.

15. The rearview device of claim 1, wherein the secondary reflective element is attached to the secondary reflective element backing plate by at least one of adhesive, a heating pad, or clip.

16. A rearview device for use with a vehicle, comprising:
a primary reflective element backing plate;
a primary reflective element positioned on the primary reflective element backing plate;
a secondary reflective element backing plate comprising a perimeter framing portion and a mounting portion;
a secondary reflective element positioned on the mounting portion of the secondary reflective element backing plate,
wherein the perimeter framing portion separates the primary reflective element from the secondary reflective element and extends beyond a viewing surface of the secondary reflective element; and
an attachment mechanism comprising at least one clip or projection in the region of the mounting portion configured to attach the secondary reflective element backing plate to the primary reflective element backing plate,
wherein the attachment mechanism aligns a primary central axis of the primary reflective element to a secondary central axis of the secondary reflective element to be substantially parallel.

* * * * *